United States Patent [19]

Preston et al.

[11] Patent Number: 5,886,319
[45] Date of Patent: Mar. 23, 1999

[54] AUTOMATIC OPERATIONS ON MATERIALS

[75] Inventors: Michael Preston, Ratcliffe-on-the-Wreake; Timothy King, Solihull; Liguo Tao, Loughborough; Michael Robert Jackson, Stoney Stanton, all of England

[73] Assignee: Loughborough University Innovations Limited, England

[21] Appl. No.: 379,549
[22] PCT Filed: Aug. 5, 1993
[86] PCT No.: PCT/GB93/01663

§ 371 Date: Mar. 16, 1995
§ 102(e) Date: Mar. 16, 1995

[87] PCT Pub. No.: WO94/03301
PCT Pub. Date: Feb. 17, 1994

[30] Foreign Application Priority Data

Aug. 5, 1992 [GB] United Kingdom ................... 9216643

[51] Int. Cl.⁶ .................................................. B23K 26/00
[52] U.S. Cl. ............................. 219/121.72; 219/121.83; 364/470.05; 364/474.09
[58] Field of Search ........................ 219/121.72, 121.83, 219/121.67; 364/474.04, 474.05, 470.05, 470.06, 474.06, 474.08, 470.02, 474.09; 112/470.04; 395/125

[56] References Cited

U.S. PATENT DOCUMENTS

| | | | |
|---|---|---|---|
| 4,691,649 | 9/1987 | Takano et al. | 112/470.04 |
| 4,853,866 | 8/1989 | Galan et al. | 364/470.06 |
| 4,905,159 | 2/1990 | Loriot | 364/470.05 |
| 4,907,169 | 3/1990 | Lovoi . | |
| 4,961,149 | 10/1990 | Schneider et al. | 364/474.09 |
| 4,998,005 | 3/1991 | Rathi et al. | 219/121.83 |
| 5,089,971 | 2/1992 | Gerber | 364/470.05 |
| 5,095,835 | 3/1992 | Jernigan et al. | 112/470.04 |
| 5,163,008 | 11/1992 | Gerber et al. | 364/474.09 |
| 5,172,326 | 12/1992 | Campbell, Jr. et al. | 364/474.08 |
| 5,255,352 | 10/1993 | Falk | 395/125 |
| 5,333,111 | 7/1994 | Chaiken et al. | 364/474.09 |
| 5,353,355 | 10/1994 | Takagi et al. | 364/470.06 |
| 5,791,215 | 8/1998 | Morrison et al. | 364/474.09 |

FOREIGN PATENT DOCUMENTS

| | | |
|---|---|---|
| 4026250 | 3/1992 | Germany . |
| 93/07327 | 4/1993 | WIPO . |

OTHER PUBLICATIONS

"Automation Of Sealant Painting And Lace Cutting Using Pattern Tracking Techniques," Kimoto, I., et al., *The International Journal Of Advanced Manufacturing Technology*, vol. 1, No. 4, pp. 101–107, 1986.

"Surface Circulation Estimation Using Image Processing And Computer Vision Methods Applied To Sequential Satellite Imagery," Yan, Xiao–Hai, et al., *Photogrammetric Engineering & Remote Sensing*, vol. 59, No. 3, pp. 407–413, Mar. 1993.

Primary Examiner—Geoffrey S. Evans
Attorney, Agent, or Firm—Wallenstein & Wagner, Ltd.

[57] ABSTRACT

Method and Apparatus for guiding an operation effector such as a laser cutter to effect an operation along a path on a patterned material using machine vision. The machine vision is used to make a map of a repeat of the pattern, a path is defined on the map by drawing a line on an area image map of the repeat of the pattern, the material and operation effector are moved relatively along the direction of pattern repeat, a line scan camera scans the material during a relative movement between the camera and the patterned material and a scanning image is compared with the map to determine the relative positions of the material and the operation effector, and the operation effector is guided to effect the operation at a position on the material corresponding to the path defined on the map.

14 Claims, 4 Drawing Sheets

AUTOMATIC OPERATIONS ON MATERIALS

This invention relates to automatic operations on materials and inter alia to carrying out high speed operations particularly but by no means exclusively cutting operations on materials especially lace.

Lace is made in wide e.g. 5 m widths from which narrower widths are cut usually along more or less deeply scalloped figuring. Mechanical arrangements exist capable of cutting relatively shallowly scalloped edges at reasonable speeds but require time-consuming setting up and constant operator attention. For the more intricate designs and deeper scalloping, it is possible to cut only by hand, which adds very considerably to the cost of the finished product.

It is, of course, known that lasers will cut materials and it is natural to contemplate the use of lasers for cutting lace. There are, however, some considerable problems involved in tracking a laser spot along the precisely required line of cut, not least because of the fact that lace is a flexible and easily distortable fabric which may well have faults which add to the problem of knowing where to cut. Moreover, the act of cutting—because the cut threads are under tension—necessarily brings about its own distortions.

Various proposals have been made for using machine vision to guide an operation effector such as a laser spot or a hot wire along a path such as a lace cutting path. I. Kimoto et al, "Automation of Sealant Painting and Lace Cutting Using Pattern Tracking Techniques", *The International Journal of Advanced Manufacturing Technology*, 1 (4) 101–107, 1986 discloses the use of a photo-sensor array to detect the flange pattern of a crankcase while it is on a moving conveyor and a micro-computer to deliver appropriate pre-recorded commands after processing input signals from the array and conveyor speed sensors to deposit liquid sealant on the flange with nozzles installed behind the sensing devices. For lace cutting, a CCD camera is mounted with a laser cutter on an X-Y traversing mechanism above the travelling lace, which is enhanced to eliminate dot ambiguities and generate a clear pattern. The curved contours of figuring on the lace can thus be clearly discriminated, and "followed" by the traversing mechanism. Pattern recognition speed for lace cutting depends on the lace pattern, but for simple patterns, cutting speeds as high as 100 mm/s are promised.

U.S. Pat. No. 4,907,169 also discloses an adaptive tracking vision and guidance system with a vision system and a robot end effector mounted on a moving platform controlled to follow a path approximating the actual path of the feature being tracked, the end effector being further controlled in real time to follow the path even though the platform might deviate therefrom.

DE-OS-40 26 250 discloses cutting lace by a CNC controlled cutting head traversing, with a camera, a travelling lace path, following a line thereon such as the edge between the lace and a connecting web between two lace sections.

A disadvantage of all such systems is that the pattern recognition algorithms are relatively slow in operation; more complicated patterns can be cut only relatively slowly as compared to simple patterns, which, in the case of lace, can be cut quite quickly in any event using conventional equipment. Moreover, some lace patterns may not have a clearly defined tracking feature, and the same will be true to a greater extent with other materials, where, indeed, a feature may be or appear to be bifurcated, creating a dilemma for the control system.

The present invention provides new methods of dealing with aspects of the problem of cutting lace that are of general application to cutting, marking or effecting other operations on other textile fabrics or indeed on materials generally.

The invention, in one aspect, comprises a method for guiding an operation effector to effect an operation along a path on a patterned material using machine vision, characterised in that machine vision is used to make a map of a repeat of the pattern, a path is defined on the map, the material and operation effector are moved relatively along the direction of pattern repeat, the machine vision scans the material during the relative movement and a scanning image is compared with the map to determine the relative positions of the material and the operation effector, and the operation effector is guided to effect the operation at a position on the material corresponding to the path defined on the map.

By "patterned material" as used herein is meant any material (whether a web material or otherwise) that has a repeating pattern that may or may not include a natural track that can be followed but which has at least one machine vision detectable, regularly recurring feature.

The map may be displayed as an image on a screen and a pointing device (such as a mouse) used to define the path on the screen image.

The machine vision may comprise a line scan camera used to build up the map and also used to produce the scanning image.

The map and scanning images may be pixel images and a cross-correlation algorithm used to establish correlation between a line of pixels on the map and a line of pixels on the image. The cross-correlation algorithm may be weighted towards the centre of the map. The cross-correlation algorithm may compensate for lateral displacement and/or distortion (both lateral and in the direction of realtive movement) of the material with respect to its mapping position/configuration.

Map and scanning image may be compared automatically at the beginning of an operation to determine a start point.

The method disclosed is very suitable for cutting lace, not only, however, cutting along a simply scalloped edge, but also for cutting along a line that crosses the transverse direction more than once, for example for cutting out panels along a closed curve or for cutting recursively scalloped edges.

The operation effector (whether for cutting lace or for effecting other operations such as marking) may comprise a laser, of which the beam may be directed to follow the path by means of a movable mirror. The mirror may be a low inertia mirror for rapid movement.

Arrangements in which a laser is moved physically across a travelling web, or a mirror travels across the web reflecting a web-parallel beam down on to the web surface, are limited as to their speed of operation. More rapid spot movement may be achieved with an angularly movable mirror, but there are problems associated with such arrangements. Highest rates of deflection corresponding to high throughput speeds can best be achieved if the angularly deflected mirror is of low inertia; but for high speed operation, the reduced dwell time of the beam at any one spot on the material demands the use of a high power density laser spot.

In another aspect, the invention comprises a method for rapidly deflecting a high power laser light spot over a surface to effect an operation such as cutting through a material comprising deflecting a large cross-section, low power density beam by means of a rapidly movable, low inertia mirror and focussing the mirror-deflected beam to a high power spot on the material. Such a method is especially suited to carrying out operations generally as disclosed above.

The mirror angularly delfecting the beam may be a galvanometer mirror. A high power density beam impinging on a low-inertia galvanometer mirror would rapidly damage the mirror.

If the laser used produces a small cross-section, high power density beam, such may be first expanded into the large cross-section, low power density beam. The beam, however, can be made convergent before impinging on the mirror.

The mirror may deflect the spot over a region of the material through a non-linear focussing system to compensate for differences in beam path length from the mirror as between the centre and the edges of the region.

The mirror may, however, deflect the spot over a region of the surface, the geometry of the arrangement with regard to which being such as to provide an adequately focussed spot over the region notwithstanding the differences in beam path length from the mirror as between the centre and the edges of the region.

The beam may be deflected by two mirrors pivotable on orthogonal axes to provide for movement of the spot over a two-dimensional region of the surface, enabling the removal of panels or recursive edge patterns to be cut without reversing the direction of relative movement between cutting head and material—this will avoid problems of reversing the direction of travel of tension-sensitive material such as lace.

The invention also comprises apparatus for guiding an operation effector to effect an operation along a path on a patterned material using machine vision, characterised by a machine vision system adapted to make and display a map of a repeat of the pattern, means to define a path on the map, means for relatively moving the operation effector and material in the direction of pattern repeat, the machine vision system being operable to scan the material during the relative movement, comparison means comparing the scanning image with the map to determine the relative positions of the material and the operation effector, and guidance means for the operation effector to effect the operation at a position on the material corresponding to the path defined on the map.

The invention, in another aspect, also comprises apparatus for rapidly deflecting a high power laser light spot over a surface to effect an operation such as cutting through a material, comprising a rapidly movable, low inertia mirror and a focussing arrangement focussing a mirror-deflected large cross-section, low power density beam to a high power spot on the material.

The invention also comprises a material processed, such as lace cut, using a method and/or apparatus according to the invention.

Embodiments of apparatus and methods according to the invention will now be described with reference to the accompanying drawings, in which.

Figure 1:
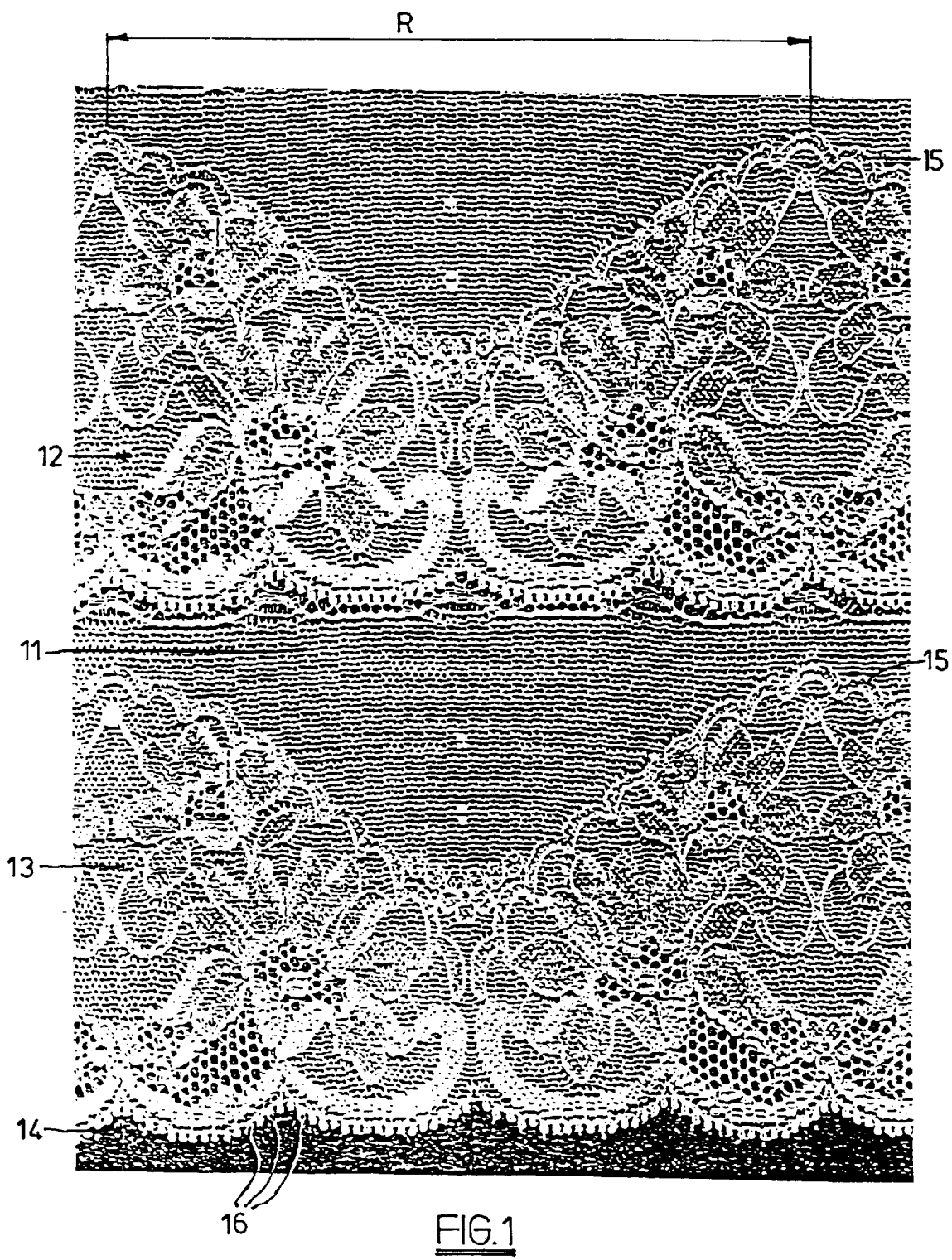
FIG. 1 is a view of a section of lace.

The drawings illustrate a method and apparatus for cutting lace of the kind shown in FIG. 1 in which a waste netting 11 separates sections 12,13. The problem is to cut the waste netting 11 away around the scalloped edges 14,15 of the sections 12,13. For edges which are not deeply scalloped, mechanical cutting arrangements exist which can, when properly set up, cope quite well, but more deeply scalloped edges can only be cut by hand, which is tedious and expensive.

FIG. 1 shows one scalloped edge 14 which has already been cut. The feature known as "pearls" is clearly seen on this cut edge. It is an indication of the accuracy to which cutting must be carried out to note that the pearls 16 are all separate, and exhibit little or nothing in the way of hanging threads.

The idea of using a laser to cut the threads is immediately attractive, but problematic. To achieve desired rates of operation, the beam must be deflected at high speed and over a substantial lateral extent—typically the "tracking width" is up to 75 mm. Physical movement of a laser is impossible at the rate required even for a modest cutting rate of say 1 m/sec, bearing in mind that a typical repeat length ("R"—see FIG. 1) is, say 2 cm, which would involve swinging the laser at a fundamental frequency of 50 Hz.

The power density required for cutting textile threads at this speed is substantial. If the laser spot diameter is, say 0.2 mm, a thread 0.1 mm wide passes through the spot in 0.003 sec and in that time has to absorb sufficient energy to melt. If, to solve the tracking problem, a mirror is used which is light enough in weight to execute the required movements at the required speeds, such a powerful laser beam would burn through it.

Figure 3:
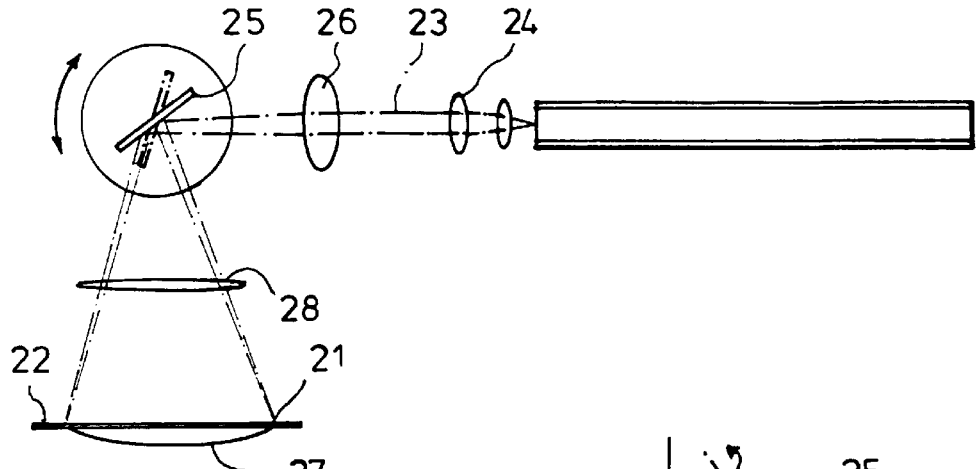
FIG. 3 is a diagrammatic illustration of a laser beam deflecting mirror arrangement.

The solution to this problem is illustrated in FIG. 3, which shows a method of directing a laser spot 21 to a surface 22 comprising expanding a laser beam 23 by a lens system 24 substantially to reduce its power density, deflecting the beam 23 by a mirror 25 whilst expanded and focussing the beam 23 to the spot 21 at the surface 22.

This is, of course, a way of deflecting a laser spot which is not required to move about, and might be required where space is limited, but it comes into its own when the mirror 25 is active and deflects the spot 21 to different positions at the surface 22 and when the mirror 25 is a low-inertia mirror for high speed deflection.

FIG. 3 illustrates an arrangement in which the mirror 25 angularly deflects the spot 21. The beam passes through a condenser 26 before the mirror 25 to focus it. If the mirror 25 rotates on its axis as illustrated, the focussed spot 21 actually moves through an arc 27. If the surface 22 is flat, it is possible to introduce a non-linear focussing system 28 between the mirror 25 and the surface, but in the case of lace cutting, it is equally possible to constrain the lace to travel in a shallow arcuate channel so that the spot 21 is always in focus without the need for a non-linear focussing system or, perhaps more realistically, to arrange that within the extent of movement of the spot, it is always adequately focussed, even if not always sharply so, over the region concerned, notwithstanding that the beam path from the mirror will have a different length at the edges of the region than it will at the centre.

The beam 23 can be expanded to a width typically of 7.5 mm and focussed down to a spot of 0.1 mm diameter or less. A 50 watt laser can produce a beam intensity at the focal plane of typically 500–10,000 watts/mm$^2$ which will allow lace to be cut at speeds up to 5 m/sec.

The mirror 25 of FIG. 3 can be a galvanometer mirror, for example of a closed loop analog galvanometer controlled by a d.c. signal of ±10 volts. Such an instrument may have a natural frequency of 1,000 Hz with no mirror attached to the rotor. Using a gold plated aluminium mirror 3 mm thick by 20 mm by 15 mm the natural frequency may be reduced to 400 Hz which will still enable quite complicated patterns to be cut at cutting speeds up to 5 m/sec.

Figure 4:
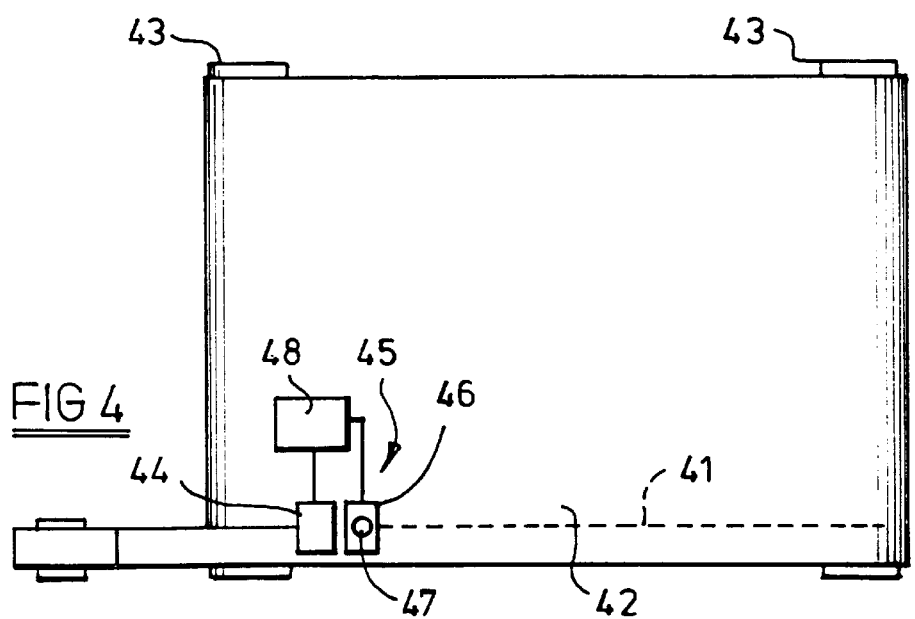
FIG. 4 is a diagrammatic plan view of a lace cutting machine.
Figure 5:
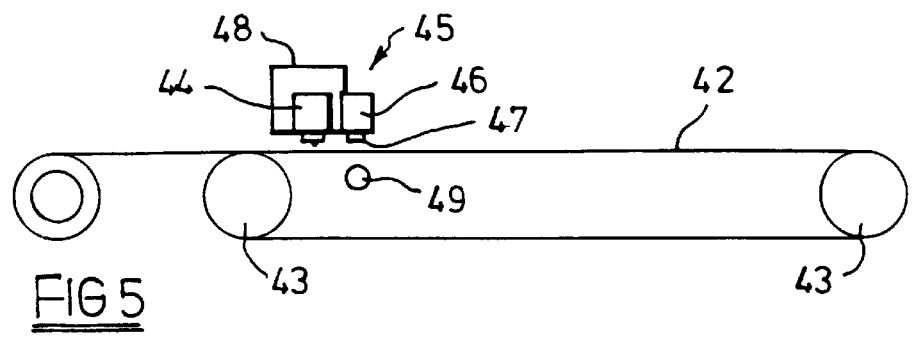
FIG. 5 is a diagrammatic side elevation of the machine of FIG. 4.

FIGS. 4 and 5 illustrate a method for effecting an operation along a path 41 on a material surface 42 that extends lengthwise of the surface 42. In this case the operation is cutting and the surface is of a web of lace which is constrained to travel in a loop on a transport system 43. In lace cutting machines it is conventional to cut a loop formed by attaching the ends of a length of some 100 m in widths up to 5 m. "Strips" of widths extending upwards from a few centimetres are cut off in turn working inwards from an edge.

Cutting is effected by a laser cutting arrangement 44 as described with reference to FIG. 3. The cutting path follows a path adjacent a scalloped edge as shown in FIG. 1 which extends over a limited widthwise extent of the whole surface of the lace web. The cutting arrangement 44 is arranged at an operating station 45 together with a machine vision arrangement 46 which operates the mirror of the cutting arrangement 44 to follow the cutting path.

The arrangement need not comprise a cutting arrangement acting on lace—any other fabric can be cut in this way if desired, or a laser (or other) beam can be controlled to effect a cutting operation other than a cutting operation, for example a marking operation. One possible arrangement could cut shapes for lingerie, e.g. brassieres or fancy edges for blouses. In addition, holes (after the fashion of broderie anglaise) may be cut in fabrics or garment panels using the arrangement in a suitable form and the technique may be used, e.g. for making buttonholes which, if the laser heat would also "seal" the edges, might avoid the need for sewing.

The machine vision arrangement 46 comprises a line scan camera 47 imaging across the width of the cutting path and ahead of the laser spot effecting the cutting, and a computer 48 outputting a control voltage to the galvanometer of the cutting arrangement 44 to steer the mirror. Illumination is by a lamp 49 beneath the lace.

Lace is, of course, produced in a limitless variety of patterns. The first task of the computer 48 is to map the pattern of the lace which is about to be cut.

As the lace is moved beneath the camera 47, an area image is built up line by line of a lengthwise extent sufficient to include a complete pattern repeat. The area image is processed to a binary image, i.e. one in which the individual pixels are either black or white.

Figure 6:
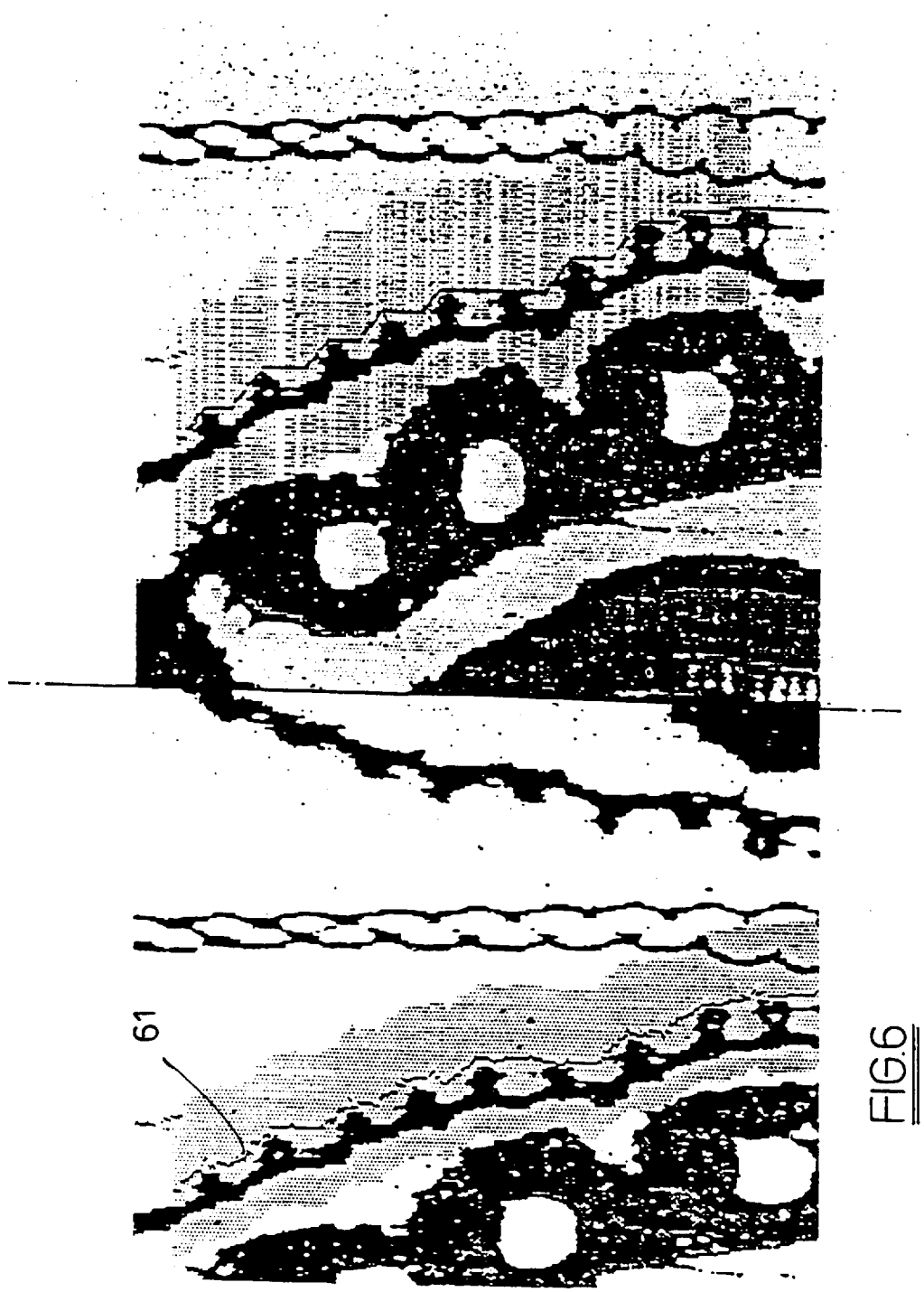
FIG. 6 is a side-by-side view of a machine vision lace image and a map illustrating the effect of distortion and showing a cutting line on the map.

FIG. 6 shows such a map, in the left-hand panel. The map is, of course, not necessarily displayed as an area image but is a virtual image stored in terms of binary data in memory in the computer 48. However, on an area image as seen in FIG. 6 can be drawn a cutting line 61 and this, too, will be stored as data in the computer 48. The cutting line 61 may be drawn "manually" on a video display by any of a variety of familiar techniques, for example by means of a mouse or with a graphics tablet, or it may be drawn automatically by software in the computer identifying the edge to be cut.

The task of the computer then is to identify, from the real-time video image from the line scan camera where, lengthwise of the map, the laser spot is and move it laterally to the lateral position of the cutting line at that lengthwise position.

A problem which is not necessarily peculiar to lace but which particulalry significant with lace is that it is not a stable fabric and can readily distort in both its lengthwise and widthwise directions.

So the real-time image from the line-scan camera during cutting will not in general correspond exactly with the map, and this is illustrated in FIG. 6, where the lace has stretched both lengthwise and widthwise as compard to the map. An autoregressive algorithm can be used to match a line on the real-time image with a line on the map, the algorithm being weighted in favour of data relating to the central part of the line.

The basic algorithm for a line match is described by the following equation:

$$\text{line }(i, j) = \sum_{k=1}^{n} \{\text{map }(i, k-j) XOR \text{ image }(i, k) * r(k)\}$$

where n is the matching length of the lines, map (i,k-j) and image (i,k) refer to the pixels in map and image. Because the data is binary (i.e. no grey levels are used) the pixel values are only 0 or 1. If 0<j<m, there are m line match results along the line i. r(k) is a value from a weighting look-up table—if all r(k) were equal to 1 this would be a normal cross-correlation, but the look-up table assigns greater values to r(k) for the central pixels.

This supposes that a matched position has already been found between the map and the image and that this line has been called line number (i−1) for both map and image.

An output (i,j) is calculated from the equation $$\text{output }(i,j) = \text{line }(i,j) + \beta^* \text{ output }(i-1,j)$$

where $0<\beta<1$, $\beta$ being a preselected "fade-out" coefficient.

The output (i) can be understood as the "match" result from several lines which are in the area from the ith position back to the (i−n)th position. The results will lose significance or "fade-out" because of repeated multiplication by the coefficient $\beta$.

The match result is calculated for position i along the lengthwise direction and several lateral search points searched and compared, the best fit being selected to calculate the cutting position.

This can take account of a significant amount of lateral distortion of the lace and handles a reasonable amount of noise.

This algorithm, by reusing results of previous steps, saves computing time over recalculating each cross-correlation from scratch.

The map and image will in general not correspond lengthwise and a strategy of longitudinal matching is adopted which compares three image lines with one map line, the best match being selected.

To cope with both lengthwise and widthwise distortion it is assumed (reasonably, in the case of known lace patterns) that lengthwise distortion will nc)t cause a map line to match three successive image lines (or vice versa). A "wait" instruction is executed if the ith image line matches the (i−1)th map line; a "step" is executed if the ith map and image lines match; and a "jump" is executed if the ith image line matches the (i+1)th map line.

But if a "wait" is required twice in succession, a "step" is forced without any match condition. If there are two sequential "jumps", a "wait" is next executed.

Such an algorithm can cope with 15% lateral and 15% longitudinal distortion, which is more than is needed to deal with permitted variations in lace.

The above description assumed that an initial match had been found. This, of course, can be done "manually" by comparing map with real-time image at the start of a cutting operation using a split screen technique. However, feature finding algorithms can be utilised to compare map and image by cross-correlation, but conventional feature finding algorithms will require to be modified, for lace, to take account of distortion.

Figure 7:
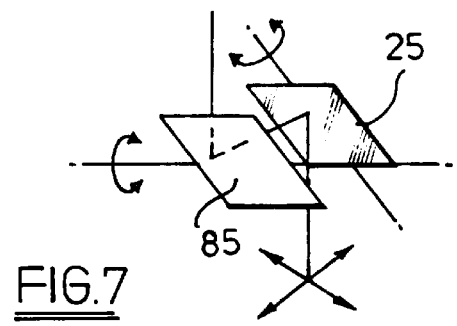
FIG. 7 is a diagrammatic view of a mirror arrangement deflecting a laser beam over a two dimensional region on a material.

Recursive shapes, in which the lace edge (or other edge to be cut) is more complicated than a simple wavy line can be handled by giving the mirror system movement about another axis. FIG. 7 illustrates a second mirror 85 pivoted on an axis orthogonal to that of the first mirror 25 and driven, again, by a galvanometer according to signals from a control system based on a map as above described.

Figure 2:
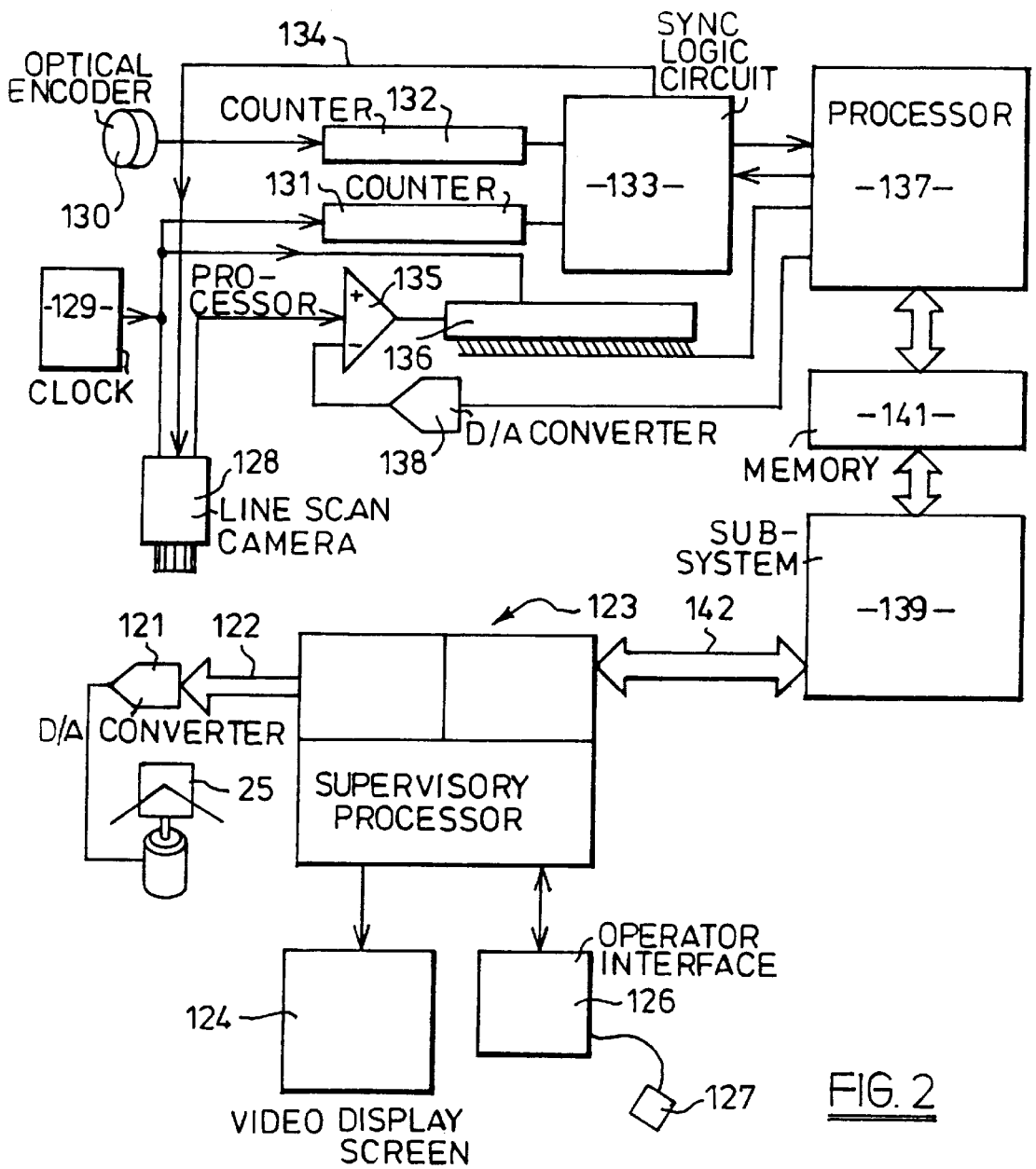
FIG. 2 is a diagrammatic illustration of apparatus for guiding a lace cutting laser beam.

FIG. 2 illustrates more comprehensively the equipment set-up to carry out the operations above described.

The galvanometer mirror 25 is driven by a voltage from a 12 bit digital to analog converter 121 receiving drive signals via a data bus 122 from a supervisory processor 123 which outputs a map and/or scanning image (using a split screen technique as required for displaying both map and scanning image together) to a video display screen 124. The system is controlled from an operator interface 126 which encompasses a pointing arrangement such as a mouse 127.

The line scan camera 128 is timed by a pixel clock 129 and outputs a pixel count to a counter 131. An optical encoder 130 driven by non-slip contact with the travelling lace web outputs to a motion counter 132, both counters being connected to scan synchronisation logic 133 to ensure that the pattern is scanned commensurately with web speed. A "start line scan" signal is passed back to the line scan camera from the logic 133 via a line 134.

The video output from the camera 128 is thresholded in a processor 135 and fed pixel-wise into a 24 bit shift register 136 for parallel transmission to a processor 137 which receives sync signals from the logic 133 and provides thresholding control signals to the processor 135 via a 12 bit digital-to-analog converter 138.

The processor 137 controls the camera (passing a start signal to the logic 133) and data acquisition procedures for example for building up an initial map from individual line scan images.

A sub-system 139 takes information from a memory 141 as necessary, the data having been input from the processor 137, to effect the tracking signals for the galvanometer mirror 25 through a control bus 142.

By defining the cut line on the map, the system avoids dependence on any distinct line feature in the pattern of the material and, further, avoids dilemmas when either of two tracking Lines would be possible at a, fork in a line feature. If the pattern is "lost", it is quickly regained by going directly to the path, without having to investigate several possible start positions.

We claim:

1. A method of guiding an operation effector to effect an operation along a path on a repeatedly longitudinal patterned material using machine vision, in which method:

(a) machine vision is used to make a map of a repeat of the pattern across the width of the material;

(b) a path is defined on the map by drawing a line on an area image map of the complete repeat of the pattern, said line extending the length of the repeat of the pattern;

(c) the material and operation effector are moved relatively along the lengthwise direction of the repeat of the pattern;

(d) the machine vision scans the pattern of the material during the relative movement of the material and operation effector, and forms a scanning image;

(e) the scanning image is compared with the map to determine the relative positions of the material and the operation effector; and (f) the operation effector is guided to effect the operation at a position on the material corresponding to the path defined on the map.

2. A method according to claim 1, characterised in that the map is displayed as an image on a screen and a pointing device is used to define the path on the screen image.

3. A method according to claim 1, in which the machine vision comprises a line scan camera used to build up the map and also used to produce the scanning image.

4. A method according to claim 1, in which the map and the scanning image are pixel images and a cross-correlation algorithm is used to establish correlation between a line of pixels on the map and a line of pixels on the image.

5. A method according to claim 4, in which the cross-correlation algorithm is weighted towards the centre of the map.

6. A method according to claim 4, in which the cross-correlation algorithm compensates for lateral displacement or distortion of the material with respect to its mapping position.

7. A method according to claim 4, in which the cross-correlation algorithm compensates for lateral displacement or distortion of the material with respect to its mapping configuration.

8. A method according to claim 1, in which the material is lace and the operation is a cutting operation.

9. A method according to claim 8, in which the cutting operation involves cutting along a scalloped edge.

10. A method according to claim 8, in which the cutting operation involves cuts along a line that crosses a line transverse to the direction of relative movement of material and operation effector more than once.

11. A method according to claim 10, in which said line comprises a closed curve.

12. A method according to claim 1, in which the operation effector comprises a laser.

13. A method according to claim 1, in which map and scanning image are compared automatically at the beginning of an operation to define a start point.

14. Apparatus for guiding an operation effector to effect an operation along a path on a patterned material using machine vision, characterized by a machine vision system adapted to make and display a map of a repeat of the pattern, means to define a path on the map by drawing a line on an area image map of the complete pattern repeat, means for relatively moving the operation effector and material in the direction of pattern repeat, the machine vision system being operable to scan the material during the relative movement, comparison means comparing the scanning image with the map to determine the relative positions of the material and the operation effector, and guidance means for the operation effector to effect the operation at a position on the material corresponding to the path define on the map.

* * * * *

UNITED STATES PATENT AND TRADEMARK OFFICE
CERTIFICATE OF CORRECTION

PATENT NO.   :   5,886,319
DATED        :   March 23, 1999
INVENTOR(S) :   Michael Preston; Timothy King; Liguo Tao; Michael Robert Jackson It is certified that errors appear in the above-identified patent and that said Letters Patent is hereby corrected as shown below:

In Column 6, Line 6, replace "compard" with "compared".

In Column 8, Line 62, replace "define on the map" with "defined on the map".

Signed and Sealed this

Seventh Day of March, 2000

Attest:

Q. TODD DICKINSON

*Attesting Officer*   *Commissioner of Patents and Trademarks*